(12) United States Patent
Abriou et al.

(10) Patent No.: US 11,062,866 B2
(45) Date of Patent: Jul. 13, 2021

(54) ELECTRICAL RELAY DEVICE

(71) Applicant: STMicroelectronics (Grand Ouest) SAS, Delarue (FR)

(72) Inventors: Vincent Abriou, Saint Georges du Bois (FR); Gerald Baeza, Mulsanne (FR)

(73) Assignee: STMicroelectronics (Grand Ouest) SAS, Delarue (FR)

( * ) Notice: Subject to any disclaimer, the term of this patent is extended or adjusted under 35 U.S.C. 154(b) by 189 days.

(21) Appl. No.: 16/021,449

(22) Filed: Jun. 28, 2018

(65) Prior Publication Data

US 2019/0019642 A1   Jan. 17, 2019

(30) Foreign Application Priority Data

Jul. 13, 2017   (FR) ..................... 1756667

(51) Int. Cl.

| H01H 47/00 | (2006.01) |
|---|---|
| H01H 3/42 | (2006.01) |
| H01H 50/54 | (2006.01) |
| H01H 53/00 | (2006.01) |
| H02N 2/00 | (2006.01) |
| H02P 8/12 | (2006.01) |
| H02P 7/06 | (2006.01) |
| H01H 57/00 | (2006.01) |

(52) U.S. Cl.
CPC ............ *H01H 47/002* (2013.01); *H01H 3/42* (2013.01); *H01H 50/54* (2013.01); *H01H 53/00* (2013.01); *H01H 57/00* (2013.01); *H02N 2/0075* (2013.01); *H02P 7/06* (2013.01); *H02P 8/12* (2013.01)

(58) Field of Classification Search
CPC ........ H01H 47/002; H01H 3/42; H01H 50/54; H01H 53/00; H01H 57/00
See application file for complete search history.

(56) References Cited

U.S. PATENT DOCUMENTS

| 6,118,257 | A  | * | 9/2000 | Biquez | ..................... | H02B 1/24 |
|---|---|---|---|---|---|---|
| | | | | | | 322/12 |
| 6,750,567 | B1 | * | 6/2004 | Elli | ..................... | H01H 11/0062 |
| | | | | | | 307/143 |
| 2008/0048499 | A1 | * | 2/2008 | Litovsky | ................. | H02J 7/345 |
| | | | | | | 307/45 |
| 2009/0120907 | A1 | | 5/2009 | Girodet et al. | | |
| 2015/0042424 | A1 | * | 2/2015 | Maruyama | ............. | H01H 33/38 |
| | | | | | | 335/179 |

(Continued)

FOREIGN PATENT DOCUMENTS

| EP | 2058178 A2 | 5/2009 |
|---|---|---|
| EP | 2061055 A1 | 5/2009 |
| WO | 2013159819 A1 | 10/2013 |

*Primary Examiner* — Thienvu V Tran
*Assistant Examiner* — Bart Iliya
(74) *Attorney, Agent, or Firm* — Slater Matsil, LLP

(57) ABSTRACT

The electrical relay device comprising a component of electrical relay type including a controllable motor, and a switching module including at least one fixed electrical contact, and at least one movable electrical contact that is mechanically coupled to the motor and configured to be placed, using the motor, in at least one position, referred to as the disconnected position, in which it does not make contact with a fixed electrical contact, or in at least one position, referred to as the connected position, in which it does make contact with the at least one fixed electrical contact.

21 Claims, 4 Drawing Sheets

(56) References Cited

U.S. PATENT DOCUMENTS

| | | | |
|---|---|---|---|
| 2016/0081865 A1* | 3/2016 | Brosnan | A61G 7/018 700/275 |
| 2016/0104992 A1* | 4/2016 | Hammond | H01R 13/2457 439/32 |

* cited by examiner

ELECTRICAL RELAY DEVICE

CROSS-REFERENCE TO RELATED APPLICATIONS

This application claims priority to French Patent Application No. 1756667, filed on Jul. 13, 2017, which application is hereby incorporated herein by reference.

TECHNICAL FIELD

Embodiments of the invention relate to electrical relay devices.

BACKGROUND

In general, a conventional electrical relay comprises a fixed electrical contact and a movable electrical contact, both linked to an electrical circuit.

The movable electrical contact is generally linked to an electromagnet via a linking part. When the electromagnetic is supplied with electric current, the electromagnet transmits an electromagnetic force to the linking part so as to move it or to deform it.

Since the movable electrical contact is linked to the linking part, the position of the movable electrical contact is therefore also modified so as to make contact with the fixed electrical contact.

By virtue of this, such a conventional electrical relay makes it possible to control the opening and the closing of the electrical circuit via another, completely isolated circuit, in this instance a circuit for supplying electric current to the electromagnet.

However, when controlling the opening or the closing of two exclusive electrical circuits, in other words in an electrical relay solution having three electrical contacts, it is common practice to produce such a device by coupling two conventional electrical relays in series.

However, such a combination of conventional electrical relays involves an increase both in manufacturing cost and in size.

Moreover, since conventional electrical relays do not generally provide other means for maintaining contact between the fixed electrical contact and the movable electrical contact, this also involves additional power consumption for supplying power to the electromagnet.

SUMMARY

One embodiment provides a solution with low power consumption and low bulk is proposed allowing, for example, the opening or the closing of a plurality of exclusive electrical circuits to be controlled using a single component of electrical relay type, and additionally being capable of maintaining the movable electrical contact in any position without additional power consumption.

According to one aspect, an electrical relay device is proposed comprising a component of electrical relay type. The component comprises a controllable motor and a switching module that includes at least one fixed electrical contact, and at least one movable electrical contact that is mechanically coupled to the motor and configured to be placed, using the motor, in a disconnected position in which it does not make contact with a fixed electrical contact, or in a connected position in which it does make contact with the at least one fixed electrical contact.

Such an electrical relay device including a motor advantageously allows the movable electrical contact to be precisely placed in a plurality of positions, including the at least one position referred to as the connected position, and to consume electrical power only when changing position.

Stated otherwise, once the movable electrical contact is placed, using the motor, in a connected position and makes contact with the fixed electrical contact, no power consumption is required to maintain the at least one movable electrical contact in this connected position.

Advantageously, the possibility to place the movable electrical contact using the motor in a plurality of positions may be achieved by means of a relatively compact implementation.

According to one embodiment, the switching module includes a first fixed electrical contact and a second fixed electrical contact and the movable electrical contact is configured to be placed either in the disconnected position, or in a first connected position in which it makes contact with the first fixed contact, or in a second connected position in which it makes contact with the second fixed contact.

According to another embodiment, the relay device additionally comprises a drive module configured to drive the movements of the motor so as to place the movable electrical contact in the disconnected position, or in one of the connected positions.

The switching module may for example comprise a position sensor configured to detect a non-placement of the movable electrical contact in the disconnected position following a current cut-off and the drive module is then advantageously configured to return, using the motor, the movable electrical contact to its disconnected position in response to the detection.

The electrical relay device may additionally comprise a control module configured to receive external control signals and to control the drive module according to the external control signals.

The control and drive modules may be located outside the component or else positioned inside the component.

By way of non-limiting example, the control module may comprise a microcontroller, such as a microcontroller of STM8® or STM32® type marketed by STMicroelectronics.

The movement of the motor may be rotary or translatory and it may be a stepper motor, a DC motor or a piezoelectric motor, without this list being exhaustive.

By way of non-limiting example, the drive module may for example comprise a circuit of H-bridge type.

According to another aspect, an electrical system is proposed, comprising an electrical relay device such as defined above.

BRIEF DESCRIPTION OF THE DRAWINGS

Other advantages and features of the invention will become apparent upon examining the detailed description of wholly non-limiting embodiments and the appended drawings, in which.

DETAILED DESCRIPTION OF ILLUSTRATIVE EMBODIMENTS

Figure 1:
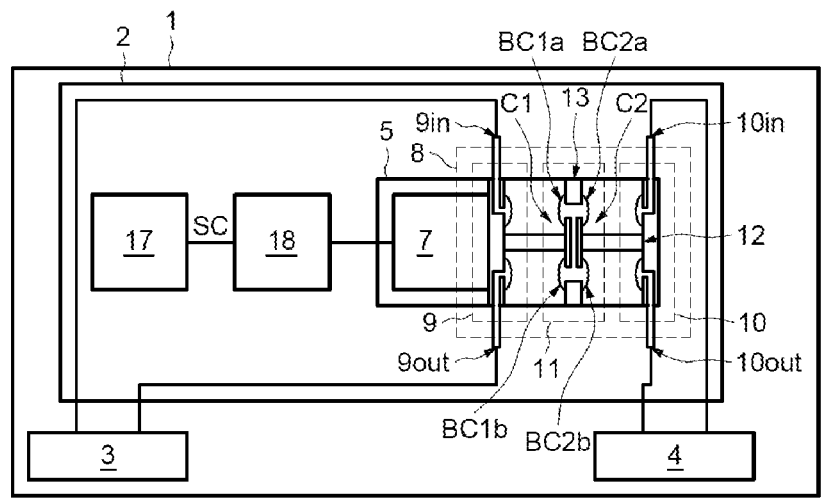
FIGS. 1 to 10 schematically show embodiments of the invention.

Embodiments of an electrical relay device will now be described. Such a device may be found, for example, in an electrical system 1, such as a gate motorization system, as shown in FIG. 1.

By way of example, an electrical relay device 2 is illustrated here, which device is intended to control, for example, the opening or the closing of a first power circuit 3 and of a second power circuit 4 of the system 1.

In order to achieve this, the device 2 includes a block (or "component of relay type") 5 containing a motor 7, here for example a conventional stepper motor commonly known to those skilled in the art.

It should be noted that FIG. 1 illustrates the device in particular with a top view of the electrical relay component 5.

This block 5 additionally comprises a switching module 8 including a first fixed electrical contact 9 and a second fixed electrical contact 10. The first fixed electrical contact 9 includes a first terminal $9_{in}$ and a second terminal $9_{out}$. The second fixed electrical contact 10 includes a first terminal $10_{in}$ and a second terminal $10_{out}$. The two terminals $9_{in}$ and $9_{out}$ are not electrically connected, and the two terminals $10_{in}$ and $10_{out}$ are also not electrically connected.

The block 5 also includes a central movable electrical contact 11 that is mechanically coupled to the stepper motor 7, here for example via a linking part 12, for example a worm drive.

The central movable electrical contact 11 includes a first side C1 facing the first fixed electrical contact 9 and a second side C2 facing the second fixed electrical contact 10. Each side C1 or C2 includes two electrically connected terminals BC1a, BC1b, BC2a and BC2b.

As such, rotary movements of the stepper motor 7 are transformed into linear movements of the central movable electrical contact 11 between the first 9 and second 10 fixed electrical contacts, by virtue of a worm drive mechanism.

Figure 2:
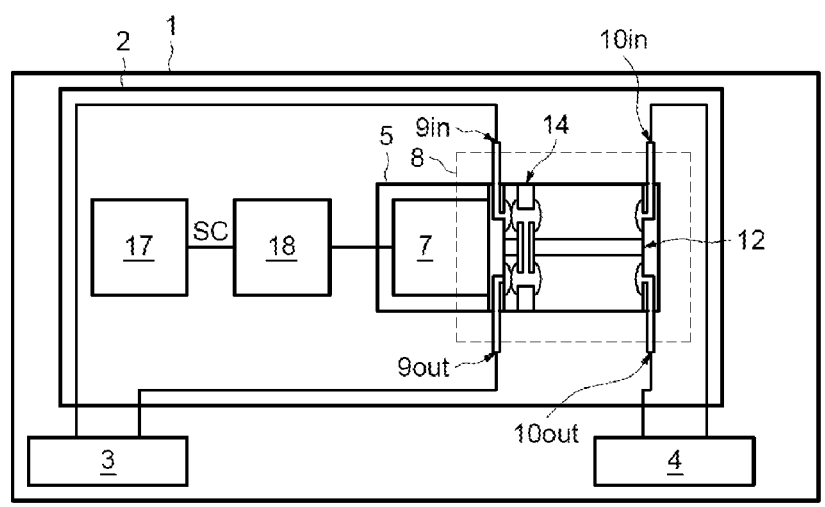
Figure 3:
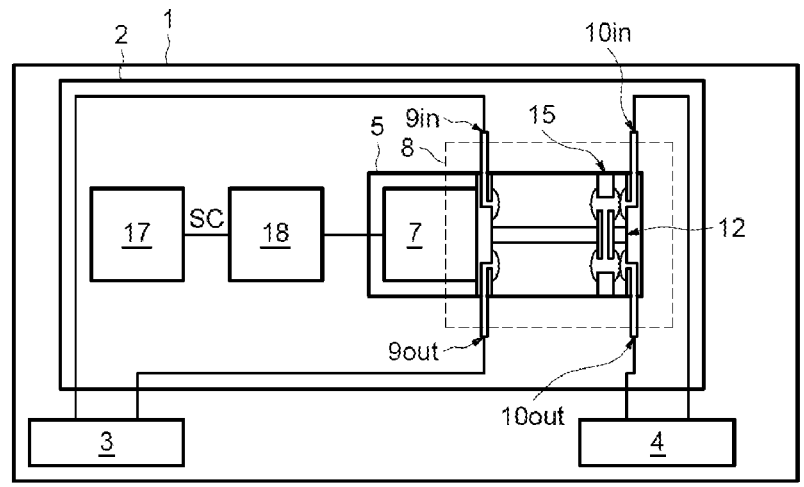

Consequently, using the stepper motor 7, the central movable electrical contact 11 is configured to be placed
  in a central disconnected position 13, for example located at an equal distance from the first 9 and second 10 fixed electrical contacts, and makes contact with neither fixed electrical contact 9 or 10, as illustrated in FIG. 1, or
  in a first connected position 14 in which it makes contact with the first $9_{in}$ and second $9_{out}$ terminals of the first fixed electrical contact 9 so as to electrically connect the first $9_{in}$ and second $9_{out}$ terminals, as illustrated in FIG. 2, or
  in a second connected position 15 in which it makes contact with the first $10_{in}$ and second $10_{out}$ terminals of the second fixed electrical contact 10 so as to electrically connect the first $10_{in}$ and second $10_{out}$ terminals, as illustrated in FIG. 3.

Since the central movable electrical contact 11 does not make contact with either of the fixed electrical contacts 9 and 10 in the central disconnected position 13, neither power circuit 3 nor 4 is closed.

However, when the central movable electrical contact 11 is placed in the first connected position 14 (FIG. 2), the first power circuit 3 is closed.

When the central movable electrical contact 11 is placed in the second connected position 15 (FIG. 3), the second power circuit 4 is closed.

Figure 4:
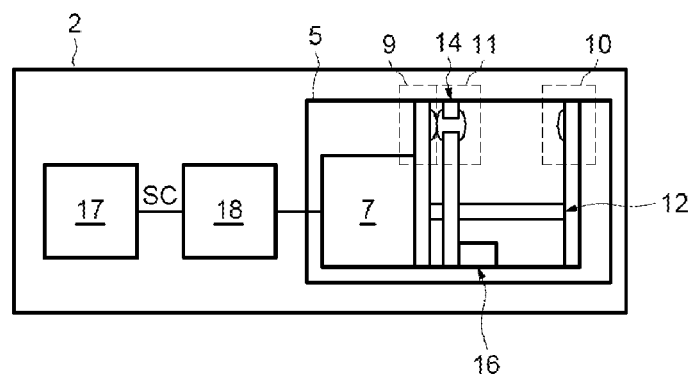

FIG. 4 illustrates a front view of the electrical relay device 2 illustrated in FIG. 2.

The block 5 may, for example, additionally include a position sensor 16 configured to detect the absence of the central movable electrical contact 11 in the central position 13.

For safety reasons, following a current cut-off, the stepper motor 7 is configured, on the command of a drive module 18, to return the central movable electrical contact 11 to the central disconnected position 13 so as to reopen the first 3 and second 4 power circuits.

By way of indication, the position sensor 16 may be produced in a conventional manner, for example, in the form of a proximity sensor, an infrared sensor or a Hall effect sensor.

The blocks 5 illustrated in FIGS. 1 to 4 may, for example, be incorporated in an eight-pin package.

The electrical relay device 2 additionally includes, for example, a control module 17 and a drive module 18. The control module 17 is configured to deliver control signals SC. The drive module 18 is coupled between the control module 17 and the motor 7 and is configured to receive the control signals SC and to drive the movements of the stepper motor 7 according to the control signals SC.

The control module 17 includes here, for example, a conventional microcontroller (MCU) of STM8® or STM32® type marketed by STMicroelectronics.

The drive module 18 may, for example, include a conventional circuit CPH, referred to as an H-bridge, known per se (FIG. 5) and comprising
  a first drive terminal BP1,
  a second drive terminal BP2,
  a first switch CM1 and a second switch CM2 that are coupled in series between the first BP1 and second BP2 drive terminals by a first node N1,
  a third switch CM3 and a fourth switch CM4 that are coupled in series between the first BP1 and second BP2 drive terminals by a second node N2,
  a load, here the motor 7, coupled between the first and second nodes N1 and N2.

The switches CM1 to CM4 may, for example, include conventional transistors. By controlling the on or off states of the switches CM1 to CM4, it is possible to obtain a positive current CP or a negative current CN flowing through the motor 7 so as to drive movements.

It should be noted that in the embodiments illustrated in FIGS. 1 to 5, the control module 17 and the drive module 18 are not included in the block 5.

Figure 6:
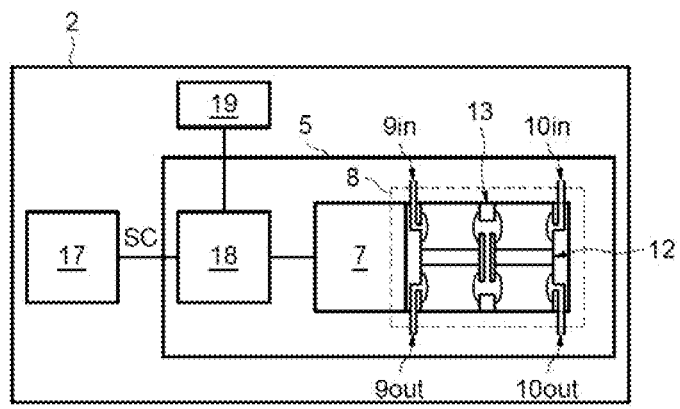

Reference is now made to FIG. 6 in order to schematically illustrate another exemplary embodiment of the electrical relay device 2.

The block or component 5 additionally comprises, in this embodiment, the drive module 18. The modes of operation of the motor 7 and of all of the modules 8, 17 and 18 remain identical to those described above.

It should be noted that the drive module 18 is, in this embodiment, supplied with power by a power source 19 that is incorporated, for example, in the device 2.

Figure 5:
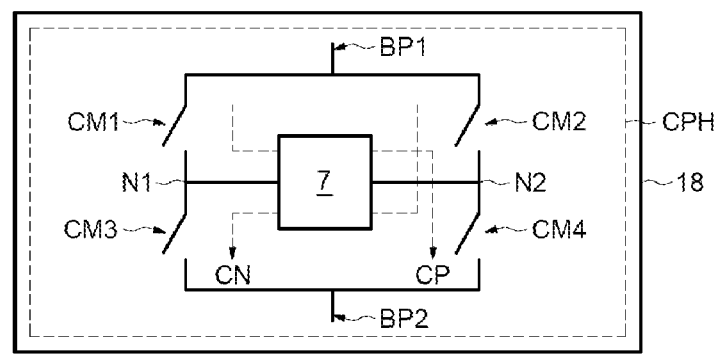

It should be noted that the blocks 5 illustrated in FIGS. 5 and 6 may, for example, be incorporated in a nine-pin package.

Figure 7:
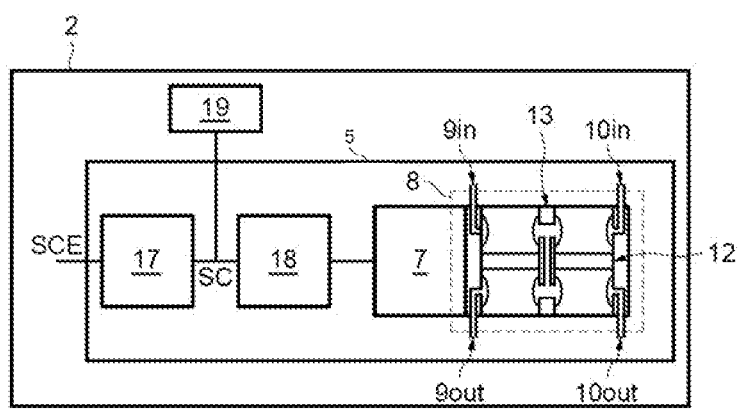

FIG. 7 also illustrates another exemplary embodiment of the electrical relay device 2.

The block or component 5 of the electrical relay device 2 includes, in this embodiment, the control 17, drive 18 and switching 8 modules and the motor 7.

The control module 17 is additionally configured to receive external control signals SCE and the control 17 and drive 18 modules are together supplied with power by the power source 19.

Figure 8:
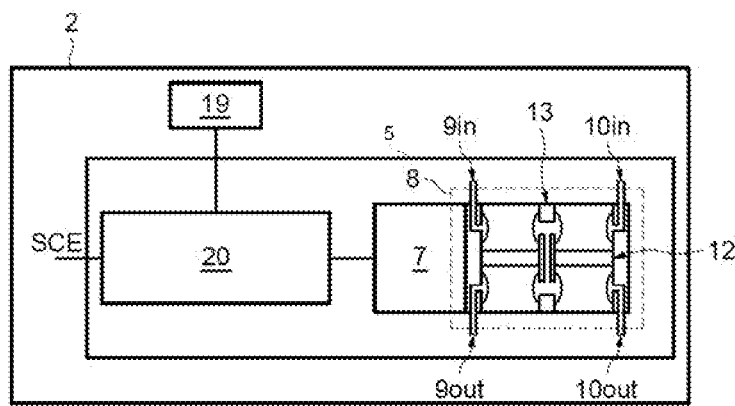

FIG. 8 illustrates another exemplary embodiment of the electrical relay device 2.

The block 5 here includes a control and drive stage 20 incorporating the control module 17 and the drive module 18 that are presented in the three preceding embodiments.

The operation of the control and drive stage 20 may, for example, be identical to that of the combination of the control 17 and drive 18 modules.

Furthermore, the control and drive stage 20 is supplied with power by the power source 19 and is configured to deliver, to the motor 7, the signals for controlling the motor SC according to the external control signals SCE received.

Thus, a relatively compact electrical relay device is proposed allowing the opening or the closing of one or more independent circuits to be controlled. By virtue of the use of the stepper motor and its capability to maintain contact between a fixed electrical contact and a movable electrical contact, the power consumption of the electrical relay device is low in comparison with conventional electrical relay devices.

The invention is not limited to the embodiments that have been described, but encompasses all variants.

The block 5 may, for example, comprise a single fixed electrical contact or more than two fixed electrical contacts, and at least two movable electrical contacts that may be placed in at least two different respective positions.

Figure 9:
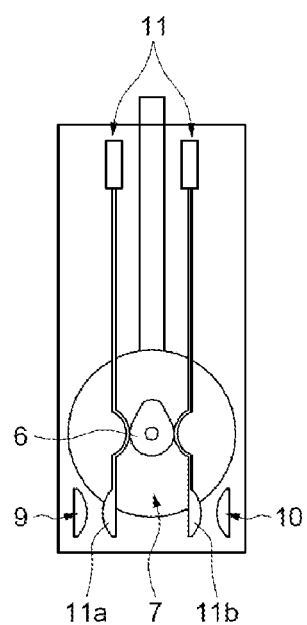

FIG. 9 schematically illustrates another exemplary embodiment of the motor 7 of the electrical relay device 2.

The motor 7 is here, for example, a brushless DC motor including a rotary cam 6 that makes contact with the movable electrical contact 11.

The movable electrical contact 11 here includes two arms 11a and 11b. In the first connected position, the arm 11a comes into contact with the first fixed electrical contact 9. In the second connected position, the arm 11b comes into contact with the second fixed electrical contact 10. The two connected positions are obtained through different angular positions of the cam 6.

Figure 10:
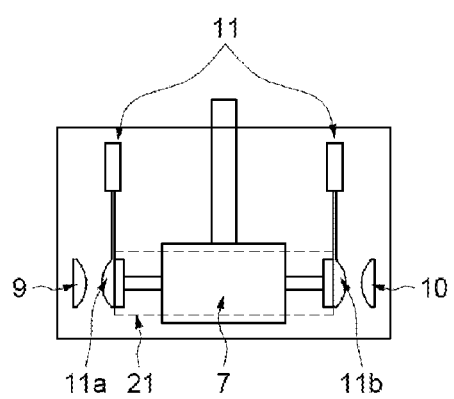

FIG. 10 also schematically illustrates another exemplary embodiment of the motor 7 of the electrical relay device 2.

The movable electrical contact 11 here also includes two arms 11a and 11b. The motor 7 is here, for example, a piezoelectric motor including a movable portion 21 that makes contact with the arm 11a and the arm 11b.

The arm 11a comes into contact with the first fixed electrical contact 9 in the first connected position and the arm 11b comes into contact with the second fixed electrical contact 10 in the second connected position. The two connected positions are obtained through the movement of the movable portion 21, which translates.

What is claimed is:

1. An electrical relay device comprising:
a controllable motor; and
a switching module including
a first fixed electrical contact comprising a first terminal and a second terminal,
a second fixed electrical contact comprising a first terminal and a second terminal, and
a movable electrical contact that is mechanically coupled to the controllable motor and configured to be placed, using the controllable motor, in a disconnected position with a first side of the movable electrical contact facing the first fixed electrical contact and a second side of the movable electrical contact facing the second fixed electrical contact in which the movable electrical contact does not make contact with the first fixed electrical contact, in a first connected position in which the movable electrical contact makes contact with the first terminal of the first fixed electrical contact and the second terminal of the first fixed electrical contact, and in a second connected position in which the movable electrical contact makes contact with the first terminal of the second fixed electrical contact and the second terminal of the second fixed electrical contact.

2. The device according to claim 1, further comprising a drive module configured to drive movements of the controllable motor so as to place the movable electrical contact in the disconnected position, in the first connected position, and in the second connected position.

3. The device according to claim 2, wherein the switching module further comprises a position sensor configured to detect whether the movable electrical contact is not in the disconnected position following a current cut-off.

4. The device according to claim 3, wherein the drive module is configured to return, using the controllable motor, the movable electrical contact to the disconnected position in response to detecting that the movable electrical contact is not in the disconnected position following the current cut-off.

5. The device according to claim 2, further comprising a control module configured to receive external control signals and to control the drive module according to the external control signals.

6. The device according to claim 5, wherein the control module and the drive module are positioned in a component of electrical relay type.

7. The device according to claim 6, wherein the control module comprises a microcontroller.

8. The device according to claim 2, wherein the drive module comprises an H-bridge circuit.

9. The device according to claim 1, wherein movement of the controllable motor is rotary.

10. The device according to claim 9, wherein the controllable motor is a stepper motor, a DC motor or a piezoelectric motor.

11. The device according to claim 1, wherein movement of the controllable motor is translatory.

12. The device according to claim 11, wherein the controllable motor is a stepper motor, a DC motor or a piezoelectric motor.

13. An electrical relay device comprising:
a controllable motor;
a switching module including a first fixed electrical contact comprising a first terminal and a second terminal, a second fixed electrical contact comprising a first terminal and a second terminal, and a movable electrical contact that is mechanically coupled to the controllable motor;
a drive module configured to drive movements of the controllable motor so as to place the movable electrical contact in:
a disconnected position with a first side of the movable electrical contact facing the first fixed electrical contact and a second side of the movable electrical contact facing the second fixed electrical contact in which the movable electrical contact does not make contact with the first fixed electrical contact or the second fixed electrical contact; and
a first connected position in which the movable electrical contact is in contact with the first terminal of the first fixed electrical contact and the second terminal of the first fixed electrical contact; and
a second connected position in which the movable electrical contact is in contact with the first terminal of the second fixed electrical contact and the second terminal of the second fixed electrical contact; and
a control module comprising a microcontroller, the control module being configured to receive external control signals and to control the drive module according to the external control signals.

14. The device according to claim 13, further comprising a position sensor configured to detect whether the movable electrical contact is not in the disconnected position following a current cut-off.

15. The device according to claim 14, wherein the drive module is configured to return, using the controllable motor, the movable electrical contact to the disconnected position in response to detecting that the movable electrical contact is not in the disconnected position following the current cut-off.

16. The device according to claim 13, wherein movement of the controllable motor is rotary.

17. The device according to claim 16, wherein the controllable motor is a stepper motor, a DC motor or a piezoelectric motor.

18. The device according to claim 13, wherein movement of the controllable motor is translatory.

19. A method of operating an electrical relay device, the method comprising:
controlling a motor to switch the electrical relay device to a disconnected position where a movable electrical contact is electrically isolated from a first fixed electrical contact comprising a first terminal and a second terminal, the movable electrical contact being mechanically coupled to the motor and a first side of the movable electrical contact facing the first fixed electrical contact and a second side of the movable electrical contact facing a second fixed electrical contact;
controlling the motor to switch the electrical relay device to a connected position where the movable electrical contact is electrically connected to the first terminal of the first fixed electrical contact and the second terminal of the first fixed electrical contact; and
controlling the motor to switch the electrical relay device to a second connected position where the movable electrical contact is electrically connected to a first terminal of the second fixed electrical contact and a second terminal of the second fixed electrical contact.

20. The method according to claim 19, further comprising:
detecting that the movable electrical contact is not in the disconnected position following a current cut-off; and
controlling the motor to return the movable electrical contact to the disconnected position in response to detecting that the movable electrical contact is not in the disconnected position following the current cut-off.

21. The method according to claim 19, further comprising receiving external control signals and controlling the motor according to the external control signals.

* * * * *